United States Patent
Bruck

(10) Patent No.: US 6,519,289 B1
(45) Date of Patent: Feb. 11, 2003

(54) METHOD AND APPARATUS FOR COMPENSATION OF LUMINANCE DEFECTS CAUSED BY CHROMINANCE SIGNAL PROCESSING

(75) Inventor: Guido Bruck, Voerde (DE)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/319,122
(22) PCT Filed: Dec. 10, 1997
(86) PCT No.: PCT/EP97/06882
§ 371 (c)(1),
(2), (4) Date: Jun. 1, 1999
(87) PCT Pub. No.: WO98/27745
PCT Pub. Date: Jun. 25, 1998

(30) Foreign Application Priority Data

Dec. 17, 1996 (DE) .......................... 196 52 362

(51) Int. Cl.[7] .......................... H04N 7/12; H04N 11/02; H04N 11/04
(52) U.S. Cl. .................. 375/240.27; 348/796; 348/450
(58) Field of Search ................................ 348/450, 796; 375/240.27

(56) References Cited

U.S. PATENT DOCUMENTS

| | | | |
|---|---|---|---|
| 5,497,246 A | 3/1996 | Abe | ........................... 358/426 |
| 5,585,868 A | * 12/1996 | Crosby | ........................ 348/796 |
| 5,748,242 A | * 5/1998 | Podilchuk | .................... 348/391 |

FOREIGN PATENT DOCUMENTS

| | | | |
|---|---|---|---|
| EP | 0716093 | 4/1986 | ........... H04N/11/00 |
| EP | 0253218 | 1/1988 | ............ H04N/9/64 |
| EP | 0425799 | 5/1991 | ............ H04N/9/64 |

* cited by examiner

*Primary Examiner*—Chris Kelley
*Assistant Examiner*—Charles E Parsons
(74) *Attorney, Agent, or Firm*—Joseph S. Tripoli; Ronald H. Kurdyla; Guy H. Eriksen

(57) ABSTRACT

In analogue television systems, it is known to compensate for the receiver-end luminance defects which are caused by transmitter-end low-pass filtering of the gamma-predistorted chrominance signals, with the aid of transmitter-end correction signals. This method for luminance correction can also be used in connection with modern picture coding methods such as e.g. MPEG. To that end, the chrominance is encoded and decoded again in the encoder. A correction signal is derived from the decoded chrominance signal and is used during the encoding of the luminance. The macroblocks which are motion-compensated for prediction are based on the correspondingly decoded chrominance signal and on the decoded, corrected luminance signal.

12 Claims, 3 Drawing Sheets

METHOD AND APPARATUS FOR COMPENSATION OF LUMINANCE DEFECTS CAUSED BY CHROMINANCE SIGNAL PROCESSING

The invention relates to a method and an apparatus for compensating for luminance defects produced by the processing of the chrominance signals.

PRIOR ART

EP-A-0 176 093, DE-A-3 516 110 and EP-A-0 253 218 describe a method for compensating for receiver-end luminance defects caused by transmitter- end low-pass filtering of the gamma-predistorted chrominance signals, with the aid of correction signals. This is a method which is used purely at the transmitter end and is fully compatible with existing equipment. It leads to an improvement of the picture quality in the region of highly saturated colours.

INVENTION

In the modern picture coding methods MPEG-1 (ISO/IEC 11172) and MPEG-2 (ISO/IEC 13818), only the receiver end of the transmission path, the decoder, is standardized. The transmitter end of the transmission path, the encoder, is not standardized. It is only necessary to ensure that the encoder transmits a bit stream which can be decoded by a standard decoder. MPEG-2 is currently used in the transmission of digital television signals, a small number of encoders, but many decoders being required. When the costs for an MPEG-2 encoder permit a consumer application, e.g. digital MPEG-2 video recorders can be employed. For the purpose of compatibility, a standardized bit stream must be recorded on the storage medium (magnetic or optical medium) and the decoders fitted in these video recorders must comply with the standard. Competition between individual manufacturers can then be engendered by encoders which produce different picture qualities during picture reproduction with a standardized decoder.

The invention is based on the object of specifying, in the context of digital picture coding of signal components, a method for compensating for luminance defects produced by the processing of chrominance signals. This object is achieved by means of the method specified in claim 1. The invention is based on the further object of specifying an apparatus for application of the method according to the invention. This object is achieved by means of the apparatus specified in claim 6.

The invention has recognized that the abovementioned method for luminance correction can also advantageously be used in connection with modern picture coding methods such as e.g. MPEG-1 and MPEG-2. The principle behind this compensation method is the fact that as a result of the transmitter-end gradation or γ predistortion, part of the luminance or brightness information contained in the picture is transmitted in the two chrominance signal components. This portion is greater, the smaller the luminance signal of the respective colour is and the greater the colour saturation thereof is. Each change in the chrominance signal components leads to a change in the luminance information transmitted by them. In the previous colour television transmission standards, such a change is, for example, the low-pass filtering of the two chrominance signal components prior to transmission. The coding of picture information according to the MPEG standards is also carried out with gradation-predistorted signals. The two chrominance signal components are changed by irrelevance reduction, which is performed by quantization of the DCT-coded signal values, and by the customary low-pass filtering. This change also effects a change in the luminance information contained in the chrominance signal components, which becomes visible during the reproduction of MPEG-coded video signals inter alia as blur in greatly saturated regions and as an interference signal in the luminance. This luminance interference signal is manifested like quantization noise.

The known method for luminance compensation in analogue television standards can now also be used advantageously in digital picture coding, e.g. according to the MPEG standards, in order to improve the picture quality. To that end, the chrominance is encoded and decoded again in the encoder. A correction signal is derived from the decoded chrominance signal and is used during the encoding of the luminance. The macroblocks which are motion-compensated for prediction are based on the correspondingly decoded chrominance signal and on the decoded, corrected luminance signal.

In principle, the method according to the invention consists in executing the following steps for the purpose of compensating for luminance defects produced by the processing of chrominance signals:

encoding of the chrominance signal components for a pixel block;

derived from the encoded chrominance signal components, encoder-end simulation of the encoded chrominance signal components of the pixel block which are decoded by a receiver;

formation of a luminance correction signal with the aid of the simulated chrominance signal components and the as yet unencoded luminance signal component;

encoding of the luminance signal component, combined with the luminance correction signal, for the respective pixel block.

Advantageous developments of the method according to the invention emerge from the associated dependent claims.

In principle, the inventive apparatus for compensating for luminance defects produced by the processing of chrominance signals is provided with:

first encoding means for the chrominance signal components from a pixel block;

means which are fed with the encoded chrominance signal components and serve for the encoder-end simulation of the encoded chrominance signal components of the pixel block which are decoded by a receiver;

correction means for forming a luminance correction signal with the aid of the simulated chrominance signal components and the as yet unencoded luminance signal component;

second encoding means for the luminance signal component combined with the luminance correction signal, for the respective pixel block.

Advantageous developments of the apparatus according to the invention emerge from the associated dependent claims.

DRAWINGS

Exemplary embodiments of the invention are described with reference to the drawings, in which.

EXEMPLARY EMBODIMENTS

In the following text, the relevant parts of a customary analogue colour television transmission system, such as e.g. PAL, are described first and there then follows an introduction to MPEG coding, insofar as this is necessary for application of the luminance compensation method.

Figure 1:
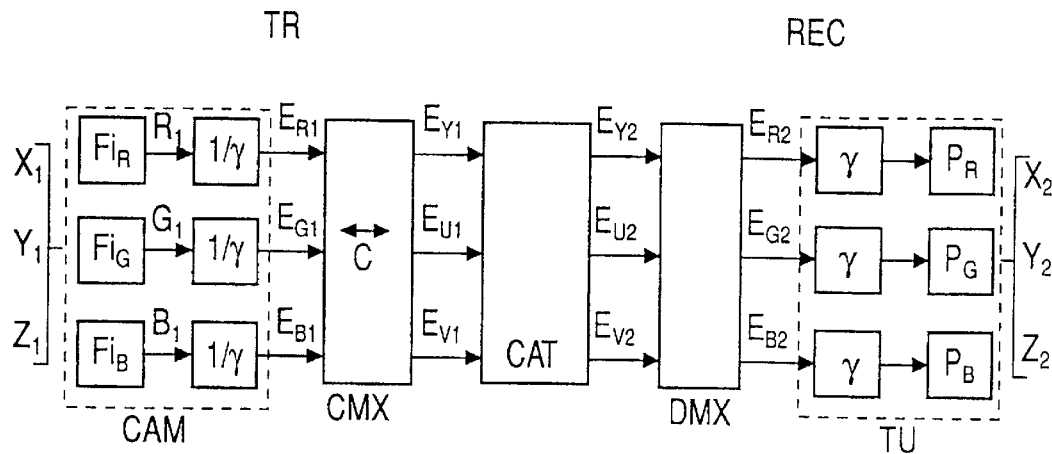
FIG. 1 shows the principle of a conventional colour television transmission system.

FIG. 1 shows the principle of such a conventional colour television transmission method. In the transmitter TR, the light radiation to be recorded, represented here by its standard colour values $X_1$, $Y_1$ and $Z_1$, is first of all converted, in a camera CAM, by means of three idealized light filters with photoelectric transducers $Fi_R$, $Fi_G$, $Fi_B$, into three electrical signals which correspond to the colour values $R_1$, $G_1$ and $B_1$.

These signals are γ-predistorted in three predistorters 1/γ, yielding the colour value signals $E_{R1}$, $E_{G1}$ and $E_{B1}$, which are then converted in a $\breve{C}$ matrix unit CMX to form the luminance signal $E_{Y1}$ and the two chrominance signal components $E_{U1}$ and $E_{V1}$. These signals are conditioned for the receiving end in a device CAT for coding and transmission.

The signals arriving at the receiver REC are generally different from the signals at the transmitter end and are therefore designated by $E_{Y2}$, $E_{U2}$ and $E_{V2}$. In the receiver REC, the conversion into the colour value signals $E_{R2}$, $E_{G2}$ and $E_{B2}$ is effected in a $\breve{D}$ matrix unit DMX, and these colour value signals are fed to the picture reproduction tube TU where they are subjected to gradation distortion γ and then, as signals $R_2$, $G_2$ and $B_2$, excite the reproduction light radiation with the standard colour values $X_2$, $Y_2$ and $Z_2$ by means of the phosphor luminescent materials $P_R$, $P_G$ and $P_B$. If the conversion of $E_{R1}$, $E_{G1}$ and $E_{B1}$ into $E_{Y1}$, $E_{U1}$ and $E_{V1}$, the conversion of $E_{Y2}$, $E_{U2}$ and $E_{V2}$ into $E_{R2}$, $E_{G2}$ and $E_{B2}$, the light filters in $Fi_R$, $Fi_G$, $Fi_B$ and the phosphors $P_R$, $P_G$ and $P_B$ and also the gradation predistortion 1/γ and the gradation distortion γ are respectively the inverse of one another and no corruption has occurred during transmission, then the reproduction standard colour values $X_2$, $Y_2$ and $Z_2$ correspond to the recording standard colour values $X_1$, $Y_1$ and $Z_1$. The use of one luminance signal and two chrominance signal components is based on the aim of transmitting the luminance information by means of the luminance signal $E_Y$ and the chrominance information separately from this in the two chrominance signal components $E_U$ and $E_V$ (constant luminance principle). However, this separation is generally not achieved on account of the gradation predistortion.

The coding of video signals according to MPEG-1 or MPEG-2 can roughly be subdivided into three stages:

motion compensation in order to be able to better utilize the redundant temporal dependencies of successive pictures, two-dimensional DCT coding with subsequent quantization of the DCT spectral values for the purpose of irrelevance reduction, and entropy coding of the suitably sorted, quantized DCT spectral values and of the coding parameters.

The coding of video signals according to MPEG or other image coding methods, such as e.g. in the case of videophones, digital cameras and digital video recorders, is also done by transmitting one luminance signal and two chrominance signal components with gradation-predistorted colour value signals.

Figure 2:
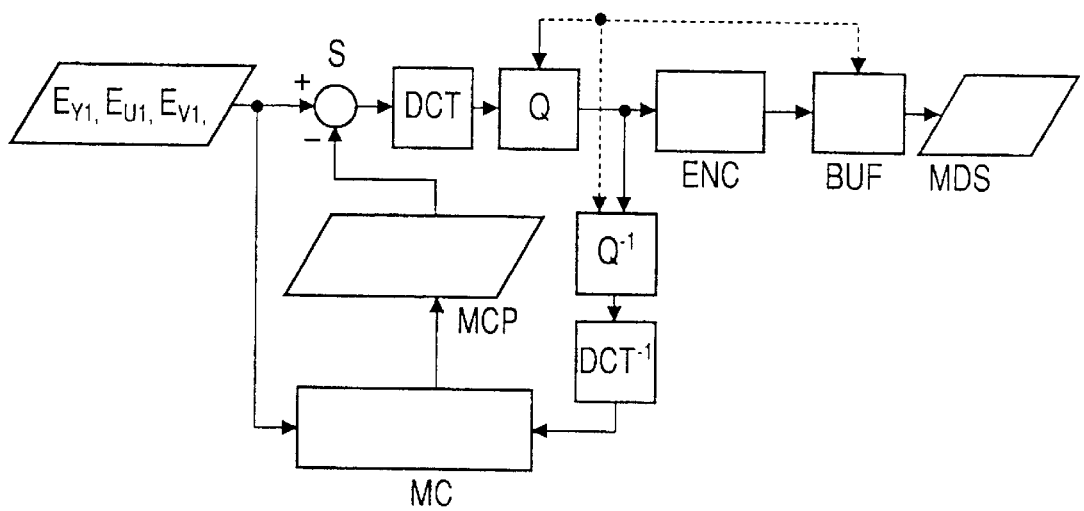
FIG. 2 shows a block diagram of an MPEG encoder.
Figure 5:
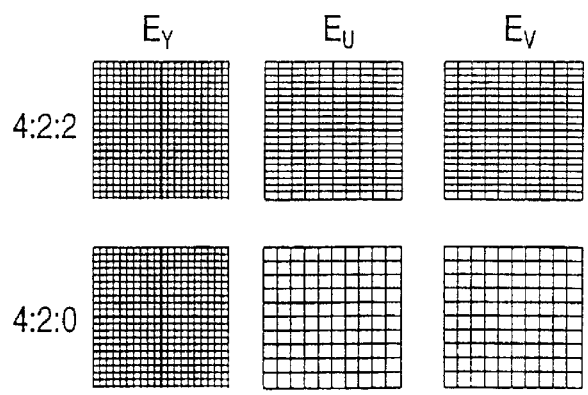
FIG. 5 shows a diagrammatic illustration of the pixels of a macroblock for the 4:2:2 and 4:2:0 data formats.

As indicated in FIG. 2 and FIG. 5, the original picture OP is split into macroblocks. In this case, the so-called I blocks are intra-coded, that is to say without reference to temporally adjacent pictures. In the special case of the so-called I pictures, this is done for all the blocks of the picture.

In the case of the non-intra-coded blocks, the difference with respect to the corresponding block MCB from a motion-compensated comparison picture MCP is first of all determined in a subtractor S and is then transformed into the spectral domain by means of a DCT (discrete cosine transform). The spectral values are quantized as a function of the type of block (intra/non-intra) and the occupancy of the output buffer BUF. The quantizer Q quantizes the more significant spectral components more coarsely than the less significant spectral components, and under certain circumstances the said more significant spectral components are completely omitted. This quantization brings about, in addition to band limiting of the chrominance components which is present normally and is effective to a greater extent than that of the luminance component, an information reduction and thus a corruption of the video signals $E_Y$, $E_U$ and $E_V$ as well.

The abovementioned difference formation can also be applied to the intra-coding, by specifying a block of all zeros as motion-compensated comparison block MCB. All of the motion-compensated comparison blocks together can be regarded as the motion-compensated comparison picture MCP which is subtracted from the original picture OP in the subtractor S.

The quantized spectral values are skilfully sorted and then subjected to corruption-free entropy coding ENC, the output code words of which are written to a buffer store BUF. From this buffer store, the data are transmitted as an MPEG data stream MDS via the transmission channel to the receiving end. As already mentioned above, the occupancy level of the output buffer is a measure of the type of quantization and correspondingly inverse quantization. If the buffer threatens to become filled to capacity, the quantization is rendered coarser, with the result that the volume of data generated becomes smaller. If the buffer threatens to become empty, the quantization is refined in order that the volume of data generated becomes larger.

The motion-compensated comparison picture MCP is generated in the motion compensation circuit MC from the original picture OP and, in order also to take account of the corruptions caused by the irrelevance reduction, from the correspondingly inversely quantized and inversely DCT-transformed output signals of the quantizer Q. Specifically, the motion compensation must exactly reconstruct the picture which is present at the receiving end, provided that no data corruptions occur during transmission. For this reason, the inverse quantization $Q^{-1}$ and an inverse DCT transformation $DCT^{-1}$ also take place in the encoder.

Owing to the abovementioned gradation predistortion, luminance information is contained in the two chrominance signal components $E_U$ and $E_V$, to be precise all the more information, the more saturated the colour and the lower the respective brightness value of the associated luminance signal are. Therefore, changes in the chrominance signal components lead to a change in the reproduced luminance. As is known from the prior art cited, in the case of analogue television signals it is possible to compensate for these corruptions at the transmitter end in a compatible manner. This measure achieves an improvement of the picture quality. If the same picture quality as without compensation is sought, then it is possible to increase the permitted corruption of the chrominance signal components. Such a change may be e.g. coarser quantization in order to be able to use a lower data rate during transmission. By appropriate parameter selection, it is also possible to combine an improvement of the picture quality with coarser quantization.

Firstly, it is necessary to determine the luminance which would be present without any corruption of the chrominance signal components, the so-called desired luminance $Y_{desired}$:

$$Y_{desired} = w_R E_{R1}^\gamma + w_G E_{G1}^\gamma + w_B E_{B1}^\gamma. \quad (1)$$

In this case, $w_R$, $w_G$ and $w_B$ are the coefficients of the individual primary colours with respect to the reproduction luminance. The following values apply for the EBU primary colour levels:

$$w_R = 0.2219, \; w_G = 0.7068, \; w_B = 0.0713, \quad (2)$$

where $\gamma$ is the gamma value of the picture reproduction tube TU. The following applies for today's customary tubes:

$$2.2 \leq \gamma \leq 2.8. \quad (3)$$

As an alternative to equation (1), it is also possible to determine the desired luminance $Y_{desired}$ from $$Y_{desired} = \qquad (4)$$
$$w_R\left(E_{Y1} + \frac{E_{V1}}{k_V}\right)^\gamma + w_G\left(E_{Y1} - \frac{c_R}{c_G}\frac{E_{V1}}{k_V} - \frac{c_B}{c_G}\frac{E_{U1}}{k_U}\right)^\gamma + w_B\left(E_{Y1} + \frac{E_{U1}}{k_U}\right)^\gamma,$$

where $C_R$, $C_G$ and $C_B$ are the coefficients of the three colour value signals with respect to the luminance signal, where $$c_R = 0.299, \; c_G = 0.587, \; c_B = 0.114, \quad (5)$$

and where $k_U$ and $k_V$ are the coefficients of the two chrominance signal components, where $$k_U = 0.493 \text{ and } k_V = 0.587. \quad (6)$$

The actual luminance $Y_{actual}$ which is present after the chrominance signal components have changed while the luminance signal remains the same can be specified in a manner corresponding to relationship (4):

$$Y_{actual} = \qquad (7)$$
$$w_R\left(E_{Y1} + \frac{E_{V2}}{k_V}\right)^\gamma + w_G\left(E_{Y1} - \frac{c_R}{c_G}\frac{E_{V2}}{k_V} - \frac{c_B}{c_G}\frac{E_{U2}}{k_U}\right)^\gamma + w_B\left(E_{Y1} + \frac{E_{U2}}{k_U}\right)^\gamma$$

In this case, $E_{U2}$ and $E_{V2}$ are the changed chrominance signal components. In general, the values of $Y_{desired}$ and $Y_{actual}$ will be different for each pixel. It is now possible to add a correction signal $\Delta E_Y$ to the transmitter-end luminance signal $E_{Y1}$ in order to make $Y_{desired}$ and $Y_{actual}$ more alike. As a result of this addition, the following is supposed to apply:

$$Y_{desired} = w_R\left(E_{Y1} + \Delta E_Y + \frac{E_{V2}}{k_V}\right)^\gamma + \qquad (8)$$
$$w_G\left(E_{Y1} + \Delta E_Y - \frac{c_R}{c_G}\frac{E_{V2}}{k_V} - \frac{c_B}{c_G}\frac{E_{U2}}{k_U}\right)^\gamma + w_B\left(E_{Y1} + \Delta E_Y + \frac{E_{U2}}{k_U}\right)^\gamma$$

When $\gamma \neq 1$, this relationship cannot be solved for $\Delta E_Y$. However, $\Delta E_Y$ can be approximated as well as desired by an iteration method.

A possible first estimated value for the correction signal $\Delta E_Y$ is:

$$\Delta E_{Y_s} = Y_{desired}^{\frac{1}{\gamma}} - Y_{actual}^{\frac{1}{\gamma}} \quad (9)$$

Should the correction by the estimated value $\Delta E_{Y_s}$ be inadequate, it is possible to determine $\Delta E_Y$ by an iteration method with the desired accuracy according to (8). In this case, $\Delta E_{Y_s}$ can be used as the start value. (7) and (8) reveal that in order to compensate for the luminance defects which are produced by processing of the chrominance signal components, at the transmitter end it is necessary to determine the reproduction luminance $Y_{actual}$ whilst taking account of the changed chrominance signal components. This is particularly advantageous in picture coding arrangements such as MPEG since that picture which the receiver obtains in the event of error-free transmission of the MPEG data stream is reconstructed in any case at the transmitter end.

Figure 3:
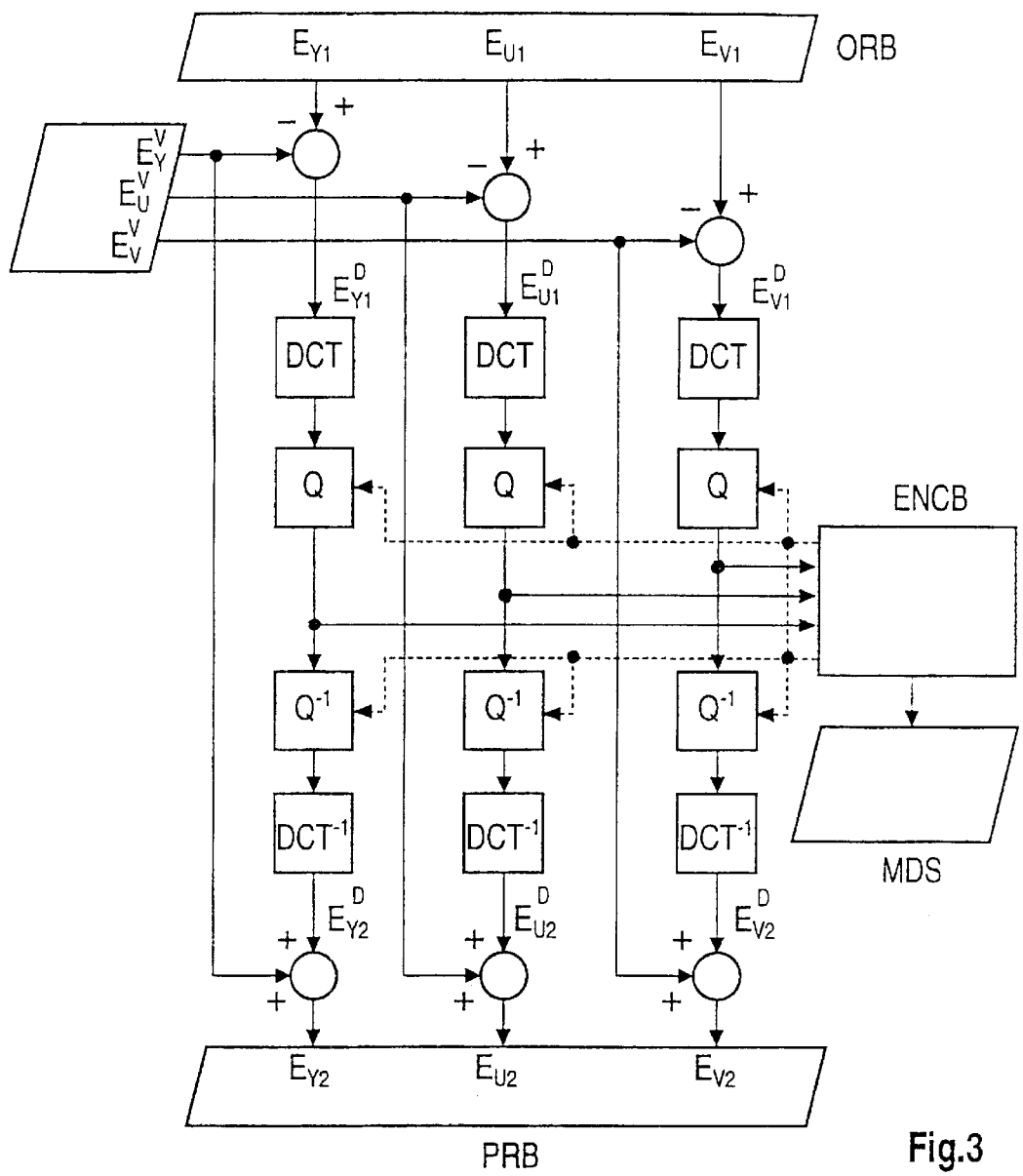
FIG. 3 shows a simplified block diagram of an MPEG encoder, separately for luminance signal and chrominance components.

FIG. 3 shows the sequence for coding a pixel block according to MPEG in a simplified block diagram. The picture is split into individual original blocks ORB, in which the irrelevance reduction is carried out independently of one another except for the setting of the quantizer Q. The coding ENCB of the three components $E_{Y1}$, $E_{U1}$ and $E_{V1}$ is likewise carried out independently of one another. Only the coding of one block is illustrated in order to improve the clarity. The operation is repeated for all the blocks of a picture. A processed block PRB for each of the three components is in each case formed by combining the output signals of the inverse DCT with the correspondingly motion-compensated comparison block MCB.

Figure 4:
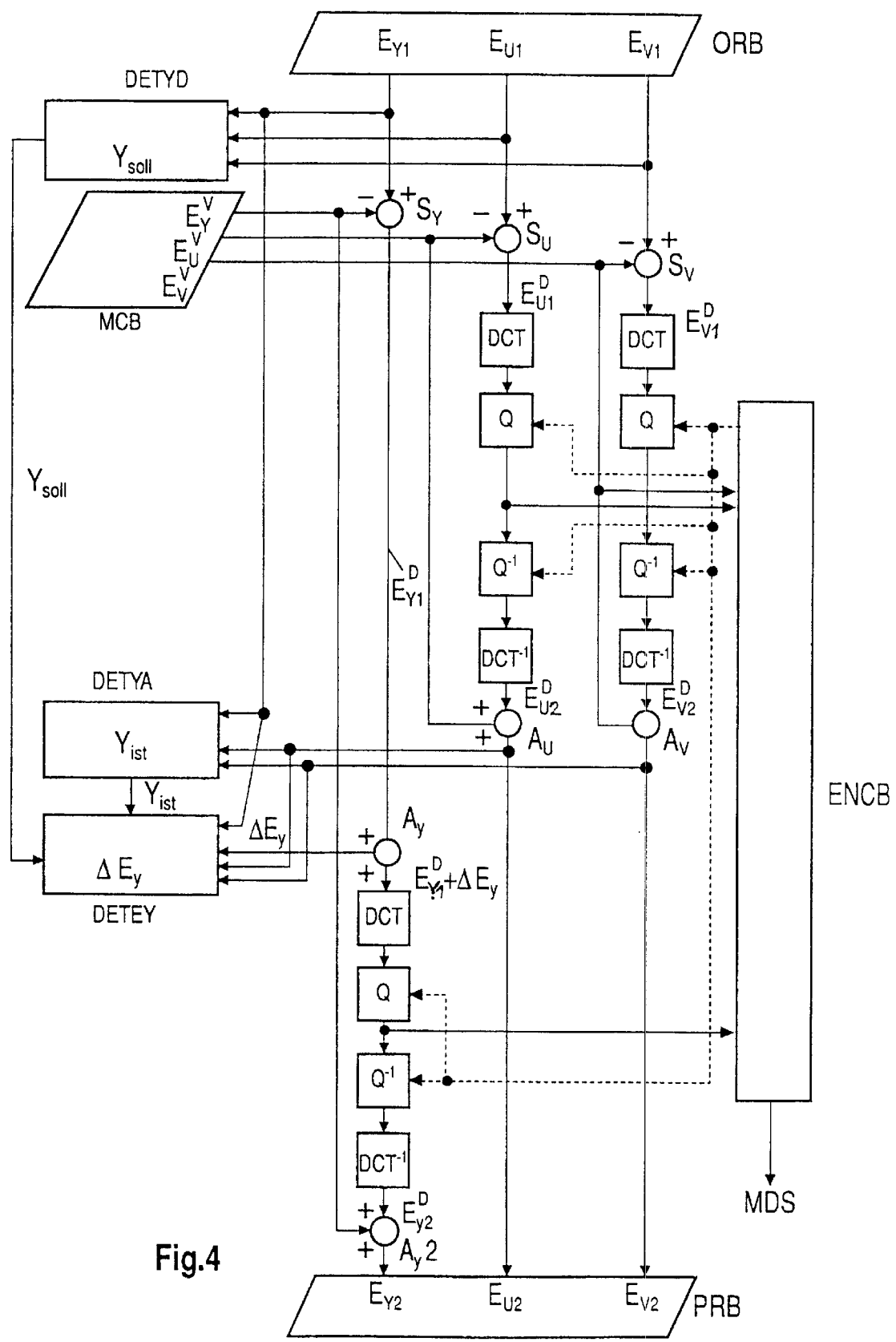
FIG. 4 shows an MPEG encoder with luminance compensation according to the invention.

When using the luminance compensation method according to the invention, however, it is now no longer possible to process the individual signal components independently of one another. Rather, the receiver-end chrominance signal components $E_{U2}$ and $E_{V2}$ must be present for the purpose of evaluating equation (7). Therefore, the processing of the two chrominance signal components is effected before the processing of the luminance signal, when viewed chronologically. FIG. 4 shows the signal processing sequence.

The desired luminance $Y_{desired}$ is determined from the signal values $E_{Y1}$, $E_{U1}$ and $E_{V1}$ of the original block ORB in first calculation means DETYD, e.g. by means of equation (4). This is then followed, if appropriate after the subtraction $S_Y$, $S_U$, $S_V$ of the motion-compensated comparison block MCB, firstly by the processing DCT and Q of the chrominance signal components. The quantized spectral coefficients are fed to the entropy coding ENCB, which also contains a buffer whose occupancy controls the quantizer Q. In order to obtain the pixel values of the block PRB which is present at the receiving end and, as described above, is necessary for the further motion compensation, the motion-compensated comparison block MCB is added to the difference signals $E_{U2}{}^D$ and $E_{V2}{}^D$ which are reconstructed by means of the inverse quantizers $Q^{-1}$ and the inverse DCTs $DCT^{-1}$. The signals $E_{U2}$ and $E_{V2}$ required in accordance with equation (7) are obtained in this way. These signals are used together with the luminance signal $E_{Y1}$ to determine the actual luminance $Y_{actual}$ according to equation (7) in second calculation means DETYA. The difference between $Y_{desired}$ and $Y_{actual}$ is determined in third calculation means DETYY and describes the corruption of the reproduction-end luminance by the change in the chrominance signal components which is implemented during the irrelevance reduction in the case of MPEG.

In order to compensate for these luminance corruptions, the compensation signal $\Delta E_Y$ is now likewise determined in the third calculation means DETYY, for example as an estimated value according to equation (9) or iteratively according to equation (8). In the latter case, the signals $E_{Y1}$, $E_{U2}$ and $E_{V2}$ must additionally be fed to the block for determining the compensation signal $\Delta E_Y$. After the compensation signal $\Delta E_Y$ has been determined, it is added to the difference luminance signal $E_{Y1}^D$. The compensated luminance signal $E_{Y1}^D + \Delta E_Y$ obtained in this way is then MPEG-coded in a conventional manner. In order to obtain the luminance signal values of the block present at the receiving end, the signal values $E_Y^V$ of the motion-compensated comparison block MCB are added to those of the reconstructed signal $E_{Y2}^D$ in a second adder $A_{Y2}$ and then form the signal $E_{Y2}$.

The MPEG-2 standard supports different data formats which share the feature that the number of pixels of the luminance signal is generally not identical to the number of pixels of the chrominance signal components. These data formats are e.g. the 4:2:2 format and the 4:2:0 format. In the first case, the number of pixels is halved for the chrominance signal components in the horizontal direction compared with that of the luminance signal, and in the second case both in the horizontal and in the vertical direction.

FIG. 5 shows a diagrammatic illustration of the arrangement of the pixels in a macroblock of 16*16 pixels, referring to the luminance signal. In the case of the 4:2:2 format, 16*8 values for the chrominance signal $E_U$ and 16*8 values for the chrominance signal $E_V$ are associated with the 16*16 luminance signal values. Consequently, for in each case two horizontally adjacent luminance signal values, the associated chrominance signal values are identical. Correspondingly, in the 4:2:0 format, in each case four luminance signal values arranged in a square are respectively assigned a chrominance signal value $E_U$ and $E_V$.

The desired luminance and the actual luminance must be determined with reference to the luminance signal for each pixel, and in doing so the above-described assignment of the chrominance signal values must be taken into account.

In order to avoid possible visible staircase structures and an increased data rate caused thereby, the correction values determined may, prior to encoding in ENCB, additionally be horizontally postfiltered, with the possibility of vertical post filtering as well in the 4:2:0 format.

According to previous investigations, relatively low data rates when coding according to MPEG lead to blurring and blocking effects, both in the chrominance and in the reproduced luminance. In some instances, pronounced blurring is visible in highly saturated colour regions which directly adjoin one another. The effects on the reproduced luminance which are caused by the processing of the chrominance signal components are avoided by application of the luminance compensation according to the invention. All that remain are the far less visible effects on the reproduced chrominance. These are less disturbing, however, due to the limitations of the human sight sense in the chrominance range.

As a result of the compensation signal $\Delta E_Y$ which is additionally added to the actual luminance signal $E_Y$, a change in the statistical properties of the luminance signal may occur. As a result, however, the volume of data required to transmit the luminance signal is increased only by a maximum of 10%, or with a fixedly predetermined data rate, the signal-to-noise ratio of the reproduced luminance becomes only slightly poorer.

The invention can also be employed in all other image coding methods, as long as the processing and reconstruction of the chrominance signal components can proceed before the processing and reconstruction of the luminance signal, when seen chronologically. Instead of the DCT, other transform types can also be used, e.g. in the context of fractal picture coding.

Examples that come into consideration are: digital cameras and digital video recorders, MPEG-4, DVD (digital versatile disc), DVB (digital video broadcast), DSS/DirecTV, videophones.

What is claimed is:

1. Method for compensating for luminance defects produced by the processing of chrominance signals in orthogonal transform encoding/decoding image data compression, comprising the following steps:

encoding of the chrominance signal components for a pixel block;

derived from the encoded chrominance signal components, encoder-end simulation of the encoded chrominance signal components of the pixel block which are decoded by a receiver;

formation of a luminance correction signal with the aid of the simulated chrominance signal components and the as yet unencoded luminance signal component;

encoding of the luminance signal component, combined with the luminance correction signal, for the respective pixel block.

2. Method according to claim 1, wherein the encoding of the chrominance signal components and the encoding of the luminance signal component combined with the luminance correction signal include a DCT and a quantisation, and in which the encoder-end simulation of the encoded chrominance signal components which are decoded by a receiver comprises a correspondingly inverse quantisation and inverse DCT.

3. Method according to claim 1, wherein the encoding corresponds to the MPEG-1 or MPEG-2 standard or is some other intraframe/interframe or intrafield/interfield encoding.

4. Method according to claim 3, wherein, in the case of interframe or interfield encoding, respective difference signals between an original pixel block and a motion-compensated pixel block originating from a preceding picture are fed to the DCT.

5. Method according to claim 1, wherein the formation of the luminance correction signal includes the following steps:

calculation of a $Y_{desired}$ value by combining pixel value portions of the luminance signal component and of the two chrominance signal components from the respective original pixel block or by combining pixel value portions of the corresponding RGB signals;

calculation of a $Y_{actual}$ value by combining pixel value portions of the luminance signal component from the respective original pixel block and the respective simulated chrominance signal components;

calculation of a difference value $$\Delta E_Y = Y_{desired}^{(1/\gamma)} - Y_{actual}^{(1/\gamma)}.$$

6. Apparatus for compensating for luminance defects produced by the processing of chrominance signals in orthogonal transform encoding/decoding image data compression, comprising:

first encoding means for the chrominance signal components from a pixel block;

means which are fed with the encoded chrominance signal components and serve for the encoder-end simulation of the encoded chrominance signal components of the pixel block which are decoded by a receiver;

correction means for forming a luminance correction signal with the aid of the simulated chrominance signal components and the as yet unencoded luminance signal component;

second encoding means for the luminance signal component combined with the luminance correction signal, for the respective pixel block.

7. Apparatus according to claim 6, wherein the first encoding means contain a DCT and a quantiser, and in which the means for the encoder-end simulation of the encoded chrominance signal components which are decoded by a receiver contain a correspondingly inverse quantiser and an inverse DCT.

8. Apparatus according to claim 6 wherein the first and second encoding means and the means for the encoder-end simulation of the encoded chrominance signal components which are decoded by a receiver are matched to the MPEG-1 or MPEG-2 standard.

9. Apparatus according to claim 7, wherein the first and second encoding means and the means for the encoder-end simulation of the encoded chrominance signal components which are decoded by a receiver are matched to the MPEG-1 or MPEG-2 standard.

10. Method according to claim 2, wherein the formation of the luminance correction signal includes the following steps:

calculation of a $Y_{desired}$ value by combining pixel value portions of the luminance signal component and of the two chrominance signal components from the respective original pixel block or by combining pixel value portions of the corresponding RGB signals;

calculation of a $Y_{actual}$ value by combining pixel value portions of the luminance signal component from the respective original pixel block and the respective simulated chrominance signal components;

calculation of a difference value $$\Delta E_Y = Y_{desired}^{(1/\gamma)} - Y_{actual}^{(1/\gamma)}.$$

11. Method according to claim 3, wherein the formation of the luminance correction signal includes the following steps:

calculation of a $Y_{desired}$ value by combining pixel value portions of the luminance signal component and of the two chrominance signal components from the respective original pixel block or by combining pixel value portions of the corresponding RGB signals;

calculation of a $Y_{actual}$ value by combining pixel value portions of the luminance signal component from the respective original pixel block and the respective simulated chrominance signal components;

calculation of a difference value $$\Delta E_Y = Y_{desired}^{(1/\gamma)} - Y_{actual}^{(1/\gamma)}.$$

12. Method according of claim 4, wherein the formation of the luminance correction signal includes the following steps:

calculation of a $Y_{desired}$ value by combining pixel value portions of the luminance signal component and of the two chrominance signal components from the respective original pixel block or by combining pixel value portions of the corresponding RGB signals;

calculation of a $Y_{actual}$ value by combining pixel value portions of the luminance signal component from the respective original pixel block and the respective simulated chrominance signal components;

calculation of a difference value $$\Delta E_Y = Y_{desired}^{(1/\gamma)} - Y_{actual}^{(1/\gamma)}.$$

* * * * *

UNITED STATES PATENT AND TRADEMARK OFFICE
CERTIFICATE OF CORRECTION

PATENT NO. : 6,519,289 B1
DATED : February 11, 2003
INVENTOR(S) : Guido Bruck

It is certified that error appears in the above-identified patent and that said Letters Patent is hereby corrected as shown below:

Title page,
Item [56], References Cited, FOREIGN PATENT DOCUMENTS,
"EP     0716093     4/1986     H04N/11/00"
should read
-- EP     0176093     4/1986     H04N/11/00 --.

Signed and Sealed this

Thirteenth Day of June, 2006

JON W. DUDAS
*Director of the United States Patent and Trademark Office*